United States Patent [19]
Lu et al.

[11] Patent Number: 6,030,592
[45] Date of Patent: Feb. 29, 2000

[54] PROCESS FOR THE DESULFURIZATION OF SULFUR DIOXIDE-CONTAINING GASES

[75] Inventors: Wei-Kao Lu, Hamilton; Charles Qiang Jia, Scarborough; Vishwaprakash Satyanarayan Hegde, Labrador; Steven Hoi-Chiu Ng, Ottawa, all of Canada

[73] Assignees: Inco Limited, Toronto; McMaster University, Hamilton, both of Canada

[21] Appl. No.: 08/240,800

[22] Filed: May 10, 1994

Related U.S. Application Data

[63] Continuation of application No. 08/059,243, May 7, 1993, abandoned.

[51] Int. Cl.$^7$ ................................................. G01R 17/20
[52] U.S. Cl. ....................................................... 423/243.01
[58] Field of Search ........................... 423/243.01, 243.09

[56] References Cited

U.S. PATENT DOCUMENTS

| | | | |
|---|---|---|---|
| 2,863,732 | 12/1958 | Bowers et al. | 23/224 |
| 3,784,680 | 1/1974 | Strong et al. | 423/571 |
| 3,838,191 | 9/1974 | Urban | 423/242 |
| 4,036,943 | 7/1977 | Huron et al. | 423/576 |
| 4,083,944 | 4/1978 | Chalmers | 423/567 |
| 4,241,041 | 12/1980 | Farin | 423/563 |
| 4,255,388 | 3/1981 | Miller | 422/168 |
| 4,837,001 | 6/1989 | Miller | 423/574 |
| 4,861,577 | 8/1989 | Talonen et al. | 423/577 |
| 4,937,057 | 6/1990 | Talonen et al. | 423/220 |

FOREIGN PATENT DOCUMENTS

| | | | |
|---|---|---|---|
| 803790 | 1/1969 | Canada . | |
| 948378 | 6/1974 | Canada | 423/243.01 |

OTHER PUBLICATIONS

Müller et al. —"Potentiometric Investigation of the Formation of Thiosufate from Alkali Sulfide and Sulfurous acid" Angwandte Chemie, 47 Jahrg. 1934, Nr. 9 (No Month).

*Primary Examiner*—Steven P. Griffin
*Assistant Examiner*—Stuart L. Hendrickson
*Attorney, Agent, or Firm*—Blake T. Biederman; Edward A. Steen

[57] ABSTRACT

The process of invention provides a simplified conversion of sulfur dioxide gas into hydrogen sulfide gas. First, sulfur dioxide gas is absorbed into an aqueous sulfide solution to form sulfite and bisulfide ions. Second, additional sulfur dioxide gas is absorbed into the aqueous solution to form hydrogen sulfide. Third, another portion of the sulfur dioxide is absorbed and reacts in the aqueous solution to form bisulfite. Most advantageously, the bisulfite is decomposed into sulfur dioxide and sulfite. The sulfite is then reduced to sulfide and returned for use in the absorption process. The hydrogen sulfide may then be reacted with $SO_2$ via the Claus reaction to form elemental sulfur.

22 Claims, 3 Drawing Sheets

PROCESS FOR THE DESULFURIZATION OF SULFUR DIOXIDE-CONTAINING GASES

This is a continuation of U.S. Ser. No. 08/059,243, filed May 7, 1993 now abandoned.

TECHNICAL FIELD

This invention relates to the desulfurization of sulfur dioxide-containing gases. This invention particularly relates to the conversion of sulfur dioxide gas into hydrogen sulfide gas.

BACKGROUND OF THE ART AND PROBLEM

The removal of sulfur dioxide from industrial flue gases such as that produced by non-ferrous sulfide smelters and fossil fuel-burning power plants, has become a common commercial practice. Effective removal of sulfur dioxide from flue gases, and its conversion into environmentally safe products has become an expensive operation. Reducing the cost of sulfur dioxide removal has the potential of benefiting industry, consumers and the environment.

In conventional sulfur dioxide removal technologies, sulfur dioxide in flue gases may be fixed as one of the following materials, sulfuric acid, liquid sulfur dioxide, elemental sulfur or calcium sulfite/sulfate. The strength of the sulfur dioxide source usually determines the ultimate end product. The limited storage capability and costs arising from long-distance shipping are the main disadvantages of converting sulfur dioxide to sulfuric acid. The problem of producing liquid sulfur dioxide is its limited market. Low strength sulfur dioxide gases are usually fixed as calcium sulfite or sulfate by lime/limestone scrubbing techniques. The drawback with scrubbing is that it converts an atmospheric pollution problem into a solid waste disposal problem.

Since elemental sulfur is easy to ship and store, and is the raw material for many sulfur consuming processes, it is the most desirable product for those sulfur dioxide producers who are located far form their customers. However, existing technologies for producing elemental sulfur are based on sodium compounds and recycling to produce $H_2S$ (an intermediate to elemental sulfur) that involve many steps, and consequently are very capital intensive and costly to operate.

For example, Engineered Systems International (ESI) has developed a carbonate based process to produce hydrogen sulfide. Hydrogen sulfide produced from the ESI process may be readily converted to elemental sulfur by the Claus reaction. In the ESI regenerable flue gas desulfurization process, the overall reactions are:

Absorption:

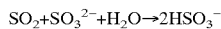

$$SO_2 + SO_3^{2-} + H_2O \rightarrow 2HSO_3^-$$

Bisulfite Neutralization:

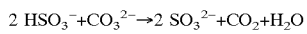

$$2\ HSO_3^- + CO_3^{2-} \rightarrow 2\ SO_3^{2-} + CO_2 + H_2O$$

Reduction of $SO_3^{2-}$:

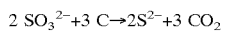

$$2\ SO_3^{2-} + 3\ C \rightarrow 2S^{2-} + 3\ CO_2$$

Generation of $H_2S$:

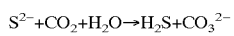

$$S^{2-} + CO_2 + H_2O \rightarrow H_2S + CO_3^{2-}$$

Claus Reaction to Produce Elemental Sulfur:

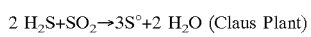

$$2\ H_2S + SO_2 \rightarrow 3S° + 2\ H_2O\ (\text{Claus Plant})$$

Although the chemicals are regenerable in this process, the process requires a large number of processing units and hence significant capital investment. There are many drawbacks in the existing sulfur dioxide removal processes aiming at hydrogen sulfide production. They arise mostly from the use of carbon dioxide and sodium carbonate. Since carbon dioxide and the alkali carbonates are costly external reagents, recovery of these chemicals is vital to the operation. Recovery of carbon dioxide and alkali carbonates introduces many additional intermediate steps and requires additional processing units. The intermediate steps that are the result of the use of carbon dioxide in the ESI processes are: neutralization of $NaHSO_3$ by $Na_2CO_3$ and collection of $CO_2$; carbon dioxide absorption in two steps (pre-carbonation and pressure carbonation); filtration of bicarbonate solids; and decomposition of $NaHCO_3$ to $Na_2CO_3$ and $CO_2$.

Outokumpu discloses another method of recovering elemental sulfur from sulfur dioxide gas in U.S. Pat. No. 4,937,057. In the Outokumpu process, sulfur dioxide gas is absorbed into a sodium sulfide or potassium sulfide solution maintained at a pH between 2.5 and 3.5 or a maintained oxidation-reduction potential between −70 and −150 mV in a first reactor and a pH between 3 and 5 or an oxidation-reduction potential between −100 mV and −260 mV in a second reactor. The ratio of sulfur dioxide to sodium or potassium sulfide in the first reactor is maintained between 1.8 and 2.2. The solution from the first reactor is then heated under pressure and temperature to yield elemental sulfur and sodium or potassium sulfate. The sodium or potassium sulfate solution is regenerated into sodium or potassium sulfide for use in sur dioxide absorption.

It is an object of this invention to provide an improved cost effective method of converting sulfur dioxide gas into elemental sulfur.

It is a further object of this invention to provide a carbon dioxide free method of forming elemental sulfur from sulfur dioxide.

It is a further object of this invention to provide a simplified method for forming elemental sulfur from dioxide-containing gases.

SUMMARY OF INVENTION

The process of invention provides simplified conversion of sulfur dioxide gas into hydrogen sulfide gas. First, sulfur dioxide gas is absorbed into an aqueous sulfide solution to form mainly sulfite and bisulfide ions. Second, additional sulfur dioxide gas is absorbed into the aqueous solution to form hydrogen sulfide. Third, another portion of the sulfur dioxide is absorbed and reacts to form bisulfite. Most advantageously, the bisulfite is decomposed into sulfur dioxide and sulfite. The sulfite is then reduced to sulfide and returned for use in the absorption process. The hydrogen sulfide may then be reacted with $SO_2$ via the Claus reaction to form elemental sulfur.

DESCRIPTION OF PREFERRED EMBODIMENT

Figure 1:
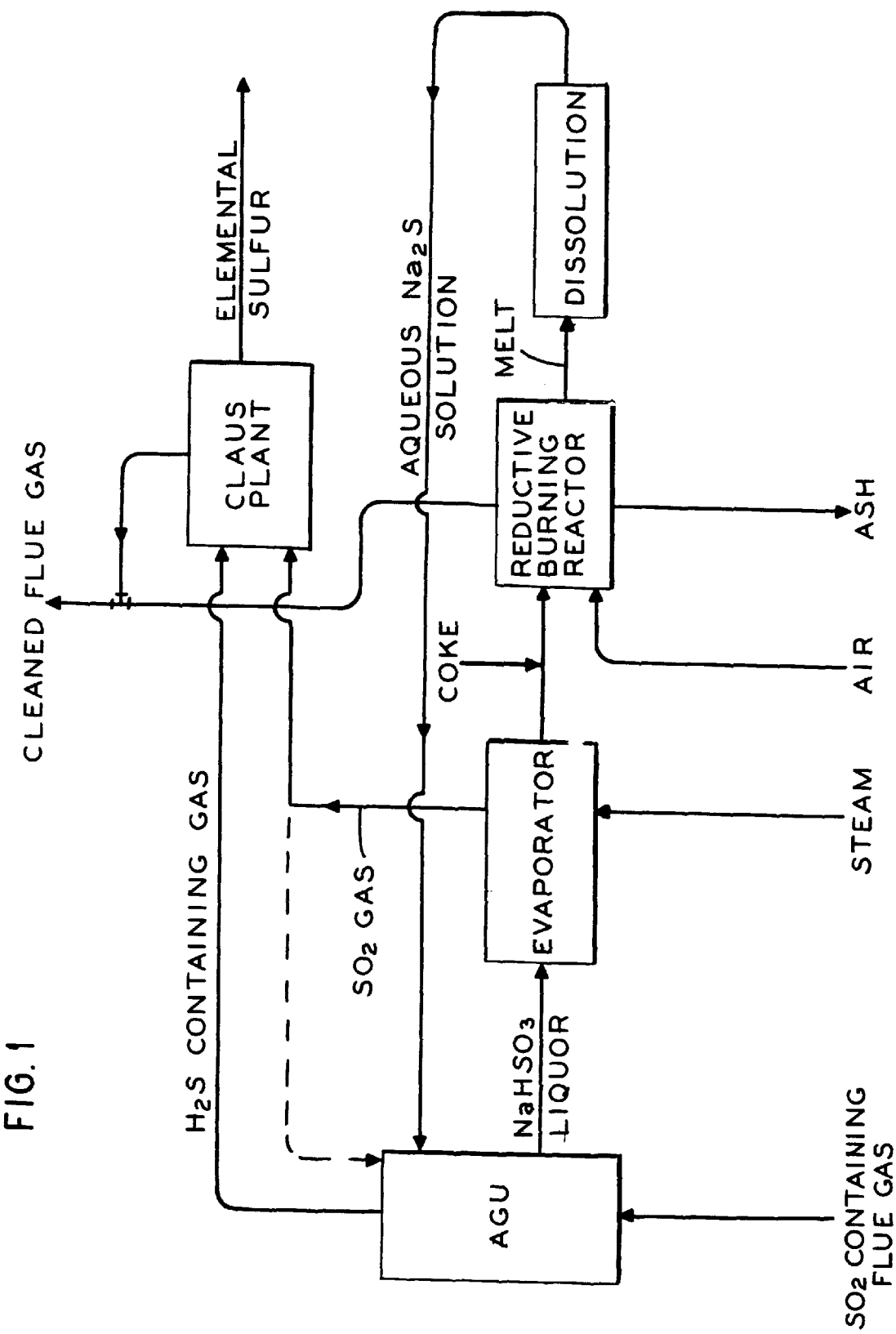
FIG. 1 is a schematic flowsheet for the conversion of sulfur dioxide gas to elemental sulfur.

As shown in FIG. 1, the process of the invention has only a few relatively simple operating steps. The process of the invention uses an absorption/generation unit (AGU) for scrubbing sulfur dioxide in aqueous sulfide solution and simultaneously producing hydrogen sulfide gas and bisulfite solution. For purposes of this specification, the AGU may consist of one or more than one vessel.

The overall reaction in AGU may be written as follows:

$$S^{2-}+2SO_2+2H_2O \rightarrow 2HSO_3^-+H_2S$$

The overall reaction comprises three "key" absorption reactions. The sulfur dioxide gas is absorbed by an aqueous sulfide solution to form sulfite and bisulfide ions as follows:

$$SO_{2(g)}+2S^{2-}_{(aq)}+H_2O_{(l)} \rightarrow SO_3^{2-}_{(aq)}+2HS^-_{(aq)} \quad (1)$$

Additional sulfur dioxide gas is absorbed to form hydrogen sulfide as follows:

$$SO_{2(g)}+HS^-_{(aq)}+H_2O_{(l)} \rightarrow HSO_3^-_{(aq)}+H_2S_{(g)} \quad (2)$$

Additional sulfur dioxide is reacted to form bisulfite as follows:

$$SO_{2(g)}+H_2O_{(l)} \rightarrow HSO_3^-_{(aq)}+H^+_{(aq)} \quad (3)$$

The bisulfite is then advantageously decomposed by the Wellmann-Lord process to form sulfite and sulfur dioxide as follows:

$$2HSO_3^-_{(aq)} \rightarrow SO_{2(g)}+SO_{3(aq)}^{2-}+H_2O_{(l)} \quad (4)$$

Sulfur dioxide gas from the Wellman-Lord process is then readily reacted with the hydrogen sulfide of reaction (2) in a Claus reactor to form elemental sulfur.

In this system involving sulfide ions originated from any soluble metal sulfide such as sodium or potassium sulfide. From a cost standpoint, it is preferred that sodium sulfide be used. Thermodynamic calculations predict that the oxidation of sulfide is an exothermic reaction. Hence oxidation of sulfide in this system can be moderated or limited by increasing the reaction temperature. However, the reaction will proceed effectively at room temperature.

Sulfide in solution may be oxidized by both sulfur dioxide and oxygen. Experimental results have illustrated that elemental sulfur can be dissolved in the sulfide-containing solution to form poly-sulfide at room temperature. According to Schmidt and co-workers, "Inorganic Sulphur Chemistry," p. 363 (1968), poly-sulfide may be degraded with sulfite, which will lead to the formation of sulfide and thiosulfate. Hence, if sulfide is oxidized in a solution containing sulfide and sulfite, poly-sulfide and thiosulfate could exist in the solution as the final products. The results of wet chemical analysis have proved the existence of thiosulfate in the spent solution, when the conversion of sodium sulfide to hydrogen sulfide was low. By operating the process of the invention at elevated temperatures, the formation of hydrogen sulfide is maximized.

The results of kinetic studies show that the overall process is very fast under the conditions studied. The dissolved sodium or potassium sulfide, which is a basic compound, should enhance the absorption of sulfur dioxide, an acidic gas. Increasing the concentration of sulfide, increases the rate of $SO_2$ absorption and decreases the formation of elemental sulfur and thiosulfate in the absorption unit.

In terms of the reactors used, two types of experiments were conducted, the mechanism study using a semi-flow batch reactor and a steady-state study using the continuous flow tank reactor.

EXAMPLE 1

In a semi-flow batch reactor, the reaction gas is fed into the system at a constant rate of 100 ml/min under standard temperature and pressure conditions without adding fresh solution during the reaction. The reactor contained 400 ml of 0.1 M $Na_2S$ solution constantly stirred and maintained at a temperature of 35° C. A feed gas having a composition of 9.29% $SO_2$, 2.14% $O_2$ and balance nitrogen with incidental impurities was introduced into the reactor through a bubble distributor.

Figure 2:
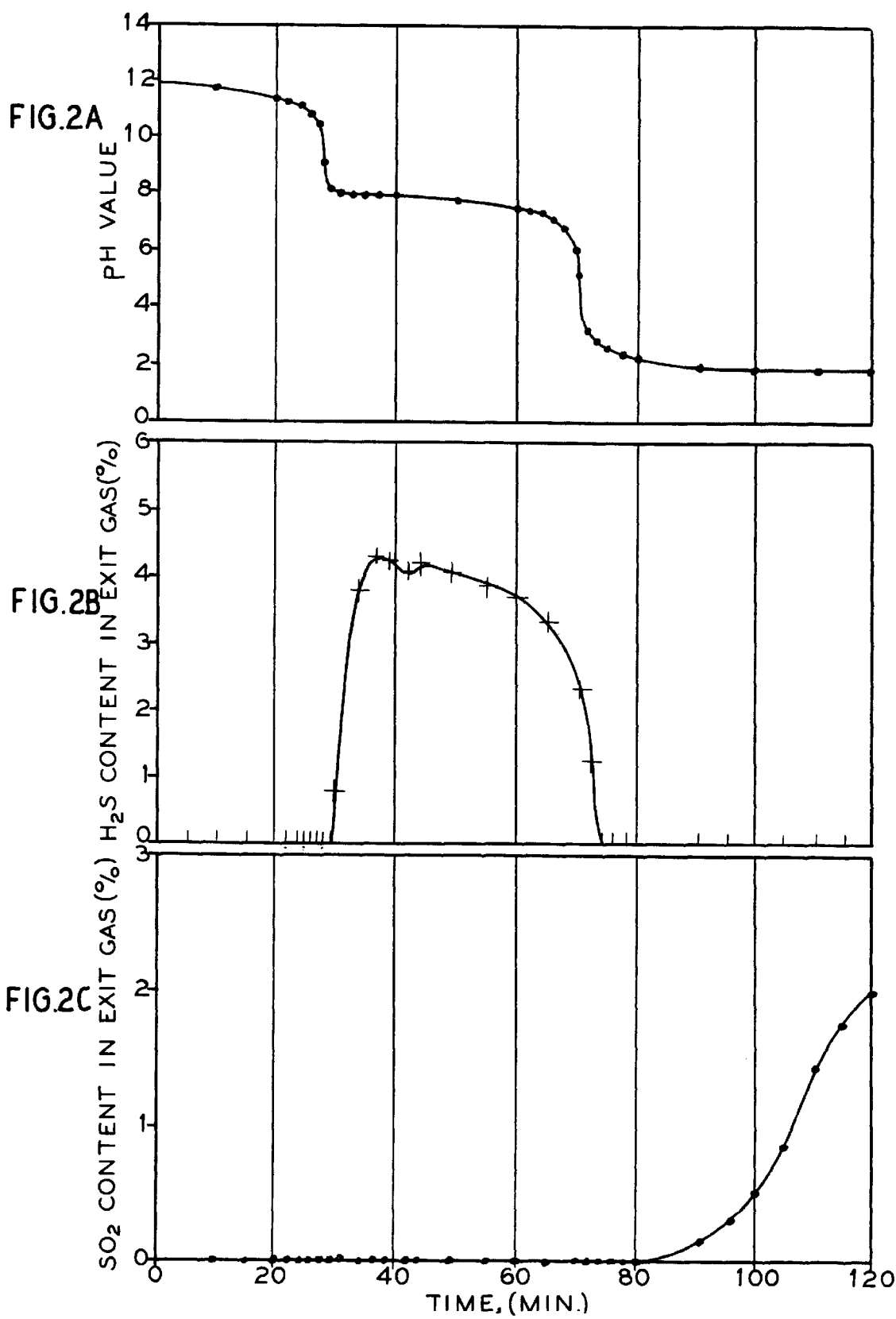
FIGS. 2a, 2b and 2c are plots of pH, $H_2S$ concentration and $SO_2$ concentration respectively, versus time for a batch operation.

As shown in FIGS. 2a, 2b and 2c, a three-stage pattern was observed, when the experiment was conducted in the semi-flow batch reactor. In the first stage, all sulfur dioxide in the feed gas is removed by the solution without the release of significant quantities of hydrogen sulfide. The first stage ends with the beginning of hydrogen sulfide generation. In the second stage, hydrogen sulfide forms with complete removal of sulfur dioxide from the feed gas. The second stage ends when no more ($HS^-$) remains in solution. In the third stage, the concentration of sulfur dioxide in the exit gas increases with time. The solution is losing its capacity of removing sulfur dioxide. In terms of the acidity of solution, two sharp drops in the pH of solution were observed, which correspond to the beginning of the second and third stages, respectively. Within each of these three stages, the changes in the pH are relatively small.

Experiments indicated that the removal of sulfur dioxide by the solution in the first as well as the second stage is complete and very efficient. For every mole of sodium sulfide used, 1.5 to 2.0 moles of sulfur dioxide are absorbed in our laboratory, depending on the conditions.

Experimentation has confirmed that the rate of hydrogen sulfide generation could be enhanced by increasing temperature. The conversion of sodium sulfide to hydrogen sulfide, which is represented by the molar ratio of hydrogen sulfide over sodium sulfide, increased significantly from 0.35 to 0.52 when temperature was increased from 40° C. to 79° C. with the use of 0.017 M sodium sulfide solution. In addition, a positive effect of the initial sodium sulfide content on the rate of hydrogen sulfide generation was observed. When the initial sodium sulfide content in solution was increased from 0.017 to 0.166 M, the conversion of sodium sulfide to hydrogen sulfide (as measured with the above conversion ratio) rose from 0.52 to 0.56 at 79° C. When the sulfur dioxide content in the feed gas was increased from 10% to 54%, the fraction of sodium sulfide converted into hydrogen sulfide decreased significantly from 52% to 12%. In summary, the simultaneous reactions involving sulfide ions and sulfur dioxide may be manipulated by controlling the reaction temperature, the initial sodium sulfide content in solution, the sulfur dioxide content in the feed gas and the pH.

In the semi-flow batch reactor, the conversion ratio of hydrogen sulfide/sodium sulfide reached 0.81 when 1.92 M sodium sulfide solution and 10% $SO_2$ were used at 90° C.

EXAMPLE 2

When a continuous flow tank reactor was used, higher conversion ratios of hydrogen sulfide to sodium sulfide were observed. The conversion of sodium sulfide to hydrogen sulfide could be over 90%, when 10% $SO_2$ gaseous mixture and 1.44 M sodium sulfide solution were used at 90° C. The flow rate of the feed gas was 540 ml/min through a bubble distributor, as measured under standard temperature and pressure conditions. The flow rate of the feed liquid was 1.0 ml/min. The reactor was continuously stirred. The continuous flow tank reactor produced an exit gas stream having an $H_2S$ concentration of 6.2%. No sulfur dioxide was detected in the exit gas stream. The molar ratio of the $H_2S$ generated to $Na_2S$ supplied into the reactor was greater than 0.9. The molar ratio of the $SO_2$ absorbed in the reactor to the $Na_2S$ supplied to the reactor was about 1.6. The pH of the reactor solution was measured to be 8.4.

A summary of the overall process of the invention wherein sulfur dioxide-containing gas is fed into an AGU is provided in FIG. 1. In the AGU sulfur dioxide is absorbed in the sulfide solution and converted into bisulfite and hydrogen sulfide gas. Under some conditions, such as when a single vessel AGU is being used or when the reactor is operated under conditions wherein little sulfur dioxide gas exits the reactor, a combination of bisulfite and sulfite is removed from the AGU. The reaction will proceed at reasonable rates at room temperature and improve at temperatures as low as 30° C. However, a higher temperature, such as 90° C., is most advantageously used to facilitate conversion to hydrogen sulfide. In addition, a pH range of 3 to 10 is advantageous for the conversion to hydrogen sulfide. Most advantageously, hydrogen sulfide is produced at a pH from 5 to 9.5. More concentrated solution of sodium sulfide, such as 1.9 M, also has been found to further promote $H_2S$ formation. Advantageously, the sulfide feed solution is maintained at a molar concentration of at least 0.1. Most advantageously, sulfide feed solution is maintained at a molar concentration of at least 1. To form elemental sulfur in a Claus plant, sulfur dioxide may be supplied from the decomposition of bisulfite contained in the AGU spent solution. Excess sulfur dioxide from the decomposition of bisulfite may be returned to the AGU. The Claus recovery unit produces desulfurized flue gas and elemental sulfur. To provide for stochiometric production of elemental sulfur the molar ratio of $H_2S/SO_2$ is advantageously maintained around 2.

Spent bisulfite liquor is readily regenerated. To regenerate the bisulfite liquor, first the liquor is treated with a heat source such as steam to evaporate excess water. Upon heating, bisulfite decomposes via the Wellman-Lord process to form $So_2$ gas (to be fed to the Claus plant) and sulfite (for reduction to sulfide). To reduce the sulfite, the sulfite is mixed with coke or carbon and burned in a reductive burning reactor. The burner may use air or oxygen enriched air added in controlled amounts to maintain a reducing atmosphere. The burner produces sulfide material, ash and an off gas. The off gas may be disposed of through a plant stack or in a Claus plant afterburner. The sulfide material may then be melted and dissolved to produce additional sulfide for use in the AGU.

Figure 3:
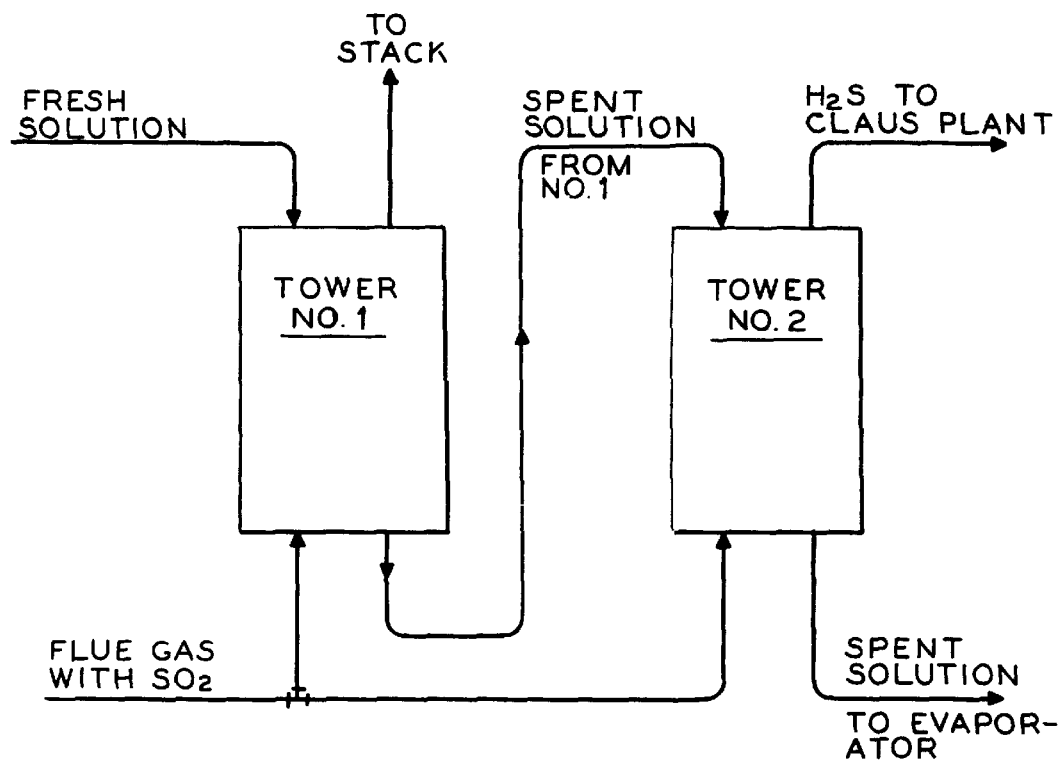
FIG. 3 is a plot of a two vessel embodiment for continuous conversion of sulfur dioxide gas into hydrogen sulfide gas.

Referring to FIG. 3, the two vessel AGU may be substituted for the single vessel design of FIG. 1. The main purpose of using the second vessel is to increase the strength of hydrogen sulfide in the exit gas and to decrease the volume of gas to be processed in the Claus plant. In the two vessel design, the first vessel is operated under the conditions of the first stage (pH 10.0 to 12.5) to absorb sulfur dioxide gas and the second vessel is operated under the conditions of the second stage (pH 3 to 10) to generate hydrogen sulfide. By having a portion of untreated flue gas entering directly into vessel number 1, part of the nitrogen associated with the flue gas will bypass the Claus plant. The volumetric flow to the Claus plant decreases, hence reducing capital costs and Claus plant operating costs.

Figure 4:
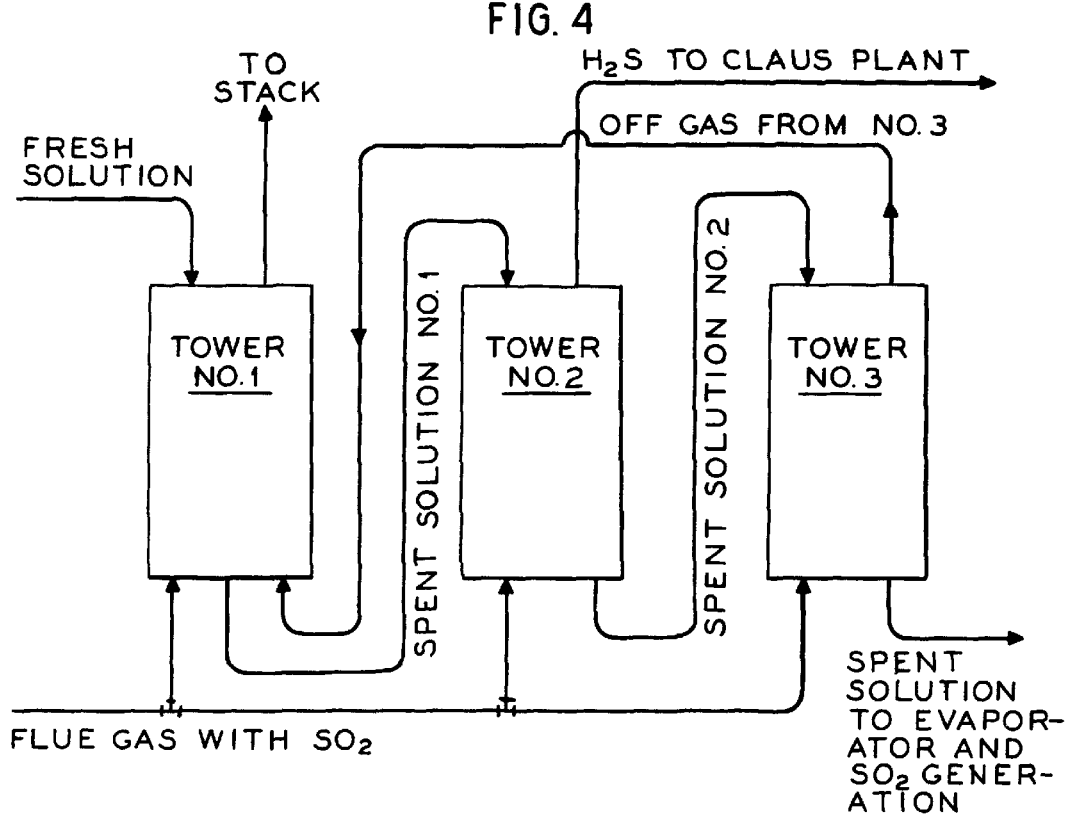
FIG. 4 is a plot of a three vessel embodiment for continuous conversion of sulfur dioxide gas into hydrogen sulfide gas.

As illustrated in FIG. 4., a third vessel may be employed. In order to control the pH of the spent solution from AGU for the purpose of subsequent treatment and the generation of $SO_2$. The third vessel should be operated at the conditions of the transition period between the second and third stages (pH 3 to 6) A third vessel may be operated at a much lower temperature than that in the second vessel. Absorption of sulfur dioxide in the third vessel may be enhanced by decreasing the operating temperature. The exit gas from the third vessel will contain sulfur dioxide and may contain small amounts of hydrogen sulfide. The removal of $SO_2$ and small amounts of $H_2S$ or from this exit gas may be accomplished by feeding it to the first vessel which is operated under the first-stage conditions. In the third vessel, the pH of the spent bisulfite liquor may be further decreased by absorbing additional quantities of sulfur dioxide. As a result, high-strength sulfur dioxide from the decomposition of bisulfite will contribute to a smaller volumetric flow of feeding gas to the Claus plant and hence a smaller reactor. Thus, the pH in the third vessel may be controlled within a wide range.

To maximize the rate of hydrogen sulfide generation and to suppress the oxidation of sulfide, the operating temperature of the second vessel should be controlled at a relatively high temperature, such as 90° C. On the other hand, the operating temperature of the third vessel could be lower.

The process of the invention provides for direct absorption of sulfur dioxide into a sulfide solution that ultimately is used for hydrogen sulfide generation. The hydrogen sulfide may be processed with sulfur dioxide via the Claus reaction to produce elemental sulfur. The simplified steps to generate $H_2S$ are easily controlled. In addition, the process should reduce capital expenditures required for installing a sulfur dioxide removal system. Furthermore, the process eliminates problems associated with addition of carbonate and carbon dioxide reagents.

The process of the invention also provides flexible process control in terms of gases handled and quality of products produced. The three-stage system provides increased flexibility in the process control for adapting to the requirements of different sulfur dioxide-containing gases and to the quality of elemental sulfur ultimately produced. Temperature is readily controllable to optimize hydrogen sulfide production.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. A process for desulfurizing sulfur dioxide-containing gas comprising the steps of:
   a) absorbing sulfur dioxide gas into an aqueous sulfide solution to remove said sulfur dioxide from a stream of gas, said aqueous sulfide solution being contained in a reactor,
   b) absorbing additional sulfur dioxide gas into said reactor to form hydrogen sulfide gas,
   c) removing hydrogen sulfide gas from said reactor,
   d) absorbing additional sulfur dioxide gas in said reactor, after said removal of hydrogen sulfide gas, to form bisulfite in said reactor, and
   e) removing aqueous bisulfite-containing solution from said reactor, with said hydrogen sulfide and bisulfite being the principal products of steps b) and d).

2. The process of claim 1 wherein step a) is performed in a first vessel of said reactor, and the aqueous solution in said first vessel of said reactor is transferred to a second vessel of said reactor, and step b) is performed in said second vessel of said reactor.

3. The process of claim 2 wherein aqueous solution in said second vessel of said reactor is transferred to a third vessel of said reactor; and said step d) is performed in said third vessel of said reactor.

4. The process of claim 1 wherein step b) is performed at a pH of about 3 to 10.

5. The process of claim 1 wherein step b) is performed at a pH of about 5 to 9.5.

6. The process of claim 1 wherein step b) is performed at a temperature of at least 30° C.

7. The process of claim 1 wherein step b) is performed at a temperature of at least 90° C.

8. The process of claim 1 wherein sulfide concentration of said aqueous sulfide solution of step a) is initially at least 0.1 molar.

9. The process of claim 1 wherein sulfide concentration of said aqueous sulfide solution of step a) is initially at least 1 molar.

10. The process of claim 1 wherein bisulfite solution of step e) is decomposed to form sulfur dioxide gas and sulfite, and sulfite formed by said decomposition is reduced to sulfide, and introducing said sulfide into said aqueous solution of step a).

11. The process of claim 1 including the additional step of reacting said hydrogen sulfide of step c) with sulfur dioxide to form elemental sulfur in a Claus reactor.

12. The process of claim 11 wherein bisulfite solution of step d) is decomposed to form sulfur dioxide gas and sulfite; and sulfite formed by said decomposition is reduced to sulfide, and introducing said sulfide into said aqueous solution of step a).

13. The process of claim 12 wherein said sulfur dioxide gas formed by decomposition is reacted with hydrogen sulfide of step c) to form elemental sulfur in a Claus reactor.

14. The process of claim 11 wherein step b) is performed at a pH of about 3 to 10.

15. The process of claim 11 wherein step b) is performed at a pH of about 5 to 9.5.

16. The process of claim 11 wherein step b) is performed at a temperature of at least 30° C.

17. The process of claim 11 wherein step b) is performed at a temperature of at least 90° C.

18. The process of claim 11 wherein sulfide concentration of said aqueous sulfide solution of step a) is initially at least 0.1 molar.

19. The process of claim 11 wherein sulfide concentration of said aqueous sulfide solution of step a) is initially at least 1 molar.

20. A process for desulfurizing sulfur dioxide-containing gas comprising the steps of:
   a) absorbing sulfur dioxide gas into an aqueous sulfide solution to remove said sulfur dioxide from a stream of gas, said aqueous sulfide solution being contained in a reactor,
   b) absorbing additional sulfur dioxide gas into said reactor to form hydrogen sulfide gas,
   c) removing hydrogen sulfide gas from said reactor,
   d) absorbing additional sulfur dioxide gas in said reactor after said removal of hydrogen sulfide gas, to form bisulfite in said reactor,
   e) removing aqueous bisulfite-containing solution from said reactor to form bisulfite, with said hydrogen sulfide and bisulfite being the principal products of steps b) and d), and
   f) reducing bisulfite of step e) to form sulfide and introducing said sulfide into said aqueous sulfide solution of step a).

21. The process of claim 20 wherein step a) is performed in a first vessel of said reactor, and the aqueous solution in said first vessel of said reactor is transferred to a second vessel of said reactor, and step b) is performed in said second vessel of said reactor.

22. The process of claim 21 wherein aqueous solution in said second vessel of said reactor is transferred to a third vessel of said reactor; and step c) is performed in said third vessel of said reactor.

* * * * *